(12) United States Patent
Batarseh

(10) Patent No.: US 10,787,893 B2
(45) Date of Patent: Sep. 29, 2020

(54) MAGNETIC PROPPANTS FOR ENHANCED FRACTURING

(71) Applicant: Saudi Arabian Oil Company, Dhahran (SA)

(72) Inventor: Sameeh Issa Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 22 days.

(21) Appl. No.: 16/269,817

(22) Filed: Feb. 7, 2019

(65) Prior Publication Data

US 2019/0211660 A1 Jul. 11, 2019

Related U.S. Application Data

(63) Continuation of application No. 16/170,560, filed on Oct. 25, 2018, now Pat. No. 10,422,209.

(60) Provisional application No. 62/615,059, filed on Jan. 9, 2018.

(51) Int. Cl.
| | | |
|---|---|---|
| *E21B 43/267* | (2006.01) | |
| *C09K 8/68* | (2006.01) | |
| *C09K 8/80* | (2006.01) | |
| *E21B 47/11* | (2012.01) | |

(52) U.S. Cl.
CPC ............ *E21B 43/267* (2013.01); *C09K 8/68* (2013.01); *C09K 8/80* (2013.01); *C09K 8/805* (2013.01); *E21B 47/11* (2020.05)

(58) Field of Classification Search
None
See application file for complete search history.

(56) References Cited

U.S. PATENT DOCUMENTS

| | | |
|---|---|---|
| 6,116,342 A | 9/2000 | Clark et al. |
| 6,817,415 B2 | 11/2004 | Orban et al. |
| 7,210,528 B1 | 5/2007 | Brannon et al. |
| 7,754,659 B2 | 7/2010 | Rediger et al. |
| 8,091,637 B2 | 1/2012 | Fripp |
| 8,109,336 B2 | 2/2012 | Wheeler et al. |
| 8,168,570 B2 | 5/2012 | Barron et al. |
| 8,356,667 B2 | 1/2013 | Quintero et al. |
| 8,869,888 B2 | 10/2014 | Cramer et al. |
| 9,040,154 B2 | 5/2015 | Rogin et al. |

(Continued)

FOREIGN PATENT DOCUMENTS

| | | |
|---|---|---|
| WO | WO-2011/153339 A1 | 12/2011 |
| WO | WO-2015/030805 A1 | 3/2015 |

(Continued)

OTHER PUBLICATIONS

International Search Report for PCT/IB2018/058391, 4 pages (dated Dec. 21, 2018).

(Continued)

*Primary Examiner* — Jeffrey D Washville
(74) *Attorney, Agent, or Firm* — Choate, Hall & Stewart LLP; Charles E. Lyon

(57) ABSTRACT

The present application relates to compositions and methods for enhancing fracturing operation. In some embodiments, the present application includes compositions and methods that are used to minimize clustering of proppants or introduce proppants into narrow fractures. In some embodiments, the compositions and methods involve magnetic proppants.

19 Claims, 7 Drawing Sheets

(56) References Cited

U.S. PATENT DOCUMENTS

| | | |
|---|---|---|
| 9,134,456 B2 | 9/2015 | Eick et al. |
| 9,170,250 B2 | 10/2015 | Lehmann et al. |
| 9,403,115 B2 | 8/2016 | Majumder et al. |
| 9,599,750 B2 | 3/2017 | Thompson et al. |
| 9,670,764 B2 | 6/2017 | Lesko et al. |
| 9,803,135 B2 | 10/2017 | Barron et al. |
| 9,840,902 B2 * | 12/2017 | Nguyen .............. C09K 8/805 |
| 9,932,809 B2 | 4/2018 | Dashevsky et al. |
| 10,422,209 B2 | 9/2019 | Batarseh |
| 2008/0283243 A1 | 11/2008 | Rediger et al. |
| 2012/0181020 A1 | 7/2012 | Barron et al. |
| 2013/0146292 A1 | 6/2013 | Litvinets et al. |
| 2015/0252668 A1 | 9/2015 | Dashevsky et al. |
| 2016/0075932 A1 | 3/2016 | Silveira et al. |
| 2016/0122631 A1 * | 5/2016 | Rodriguez .......... C09K 8/805 166/280.1 |
| 2016/0130499 A1 | 5/2016 | Nguyen |
| 2016/0320518 A1 | 11/2016 | Mangione |
| 2017/0081950 A1 | 3/2017 | Filatyev et al. |
| 2017/0158938 A1 | 6/2017 | Rodney |
| 2017/0205526 A1 | 7/2017 | Meyer |
| 2017/0218262 A1 * | 8/2017 | Nguyen .................. C09K 8/70 |
| 2017/0261643 A1 | 9/2017 | Thompson et al. |
| 2017/0361376 A1 * | 12/2017 | Murugesan ......... C09B 67/0097 |
| 2018/0044575 A1 | 2/2018 | Litvinets et al. |
| 2019/0211659 A1 | 7/2019 | Batarseh |

FOREIGN PATENT DOCUMENTS

| | | |
|---|---|---|
| WO | WO-2015/175853 A1 | 11/2015 |
| WO | WO-2016/032478 A1 | 3/2016 |
| WO | WO-2016/085451 A1 | 6/2016 |
| WO | WO-2016/168719 A1 | 10/2016 |
| WO | WO-2016/182469 A1 | 11/2016 |
| WO | WO-2018/101990 A1 | 6/2018 |
| WO | WO-2019/138275 A1 | 7/2019 |

OTHER PUBLICATIONS

Written Opinion for PCT/IB2018/058391, 4 pages (dated Dec. 21, 2018).

* cited by examiner

MAGNETIC PROPPANTS FOR ENHANCED FRACTURING

CROSS REFERENCE TO RELATED APPLICATIONS

This application is a continuation of U.S. patent application Ser. No. 16/170,560, filed Oct. 25, 2018, which claims the benefit of U.S. Provisional Patent Application No. 62/615,059, filed Jan. 9, 2018, the contents of which are hereby incorporated by reference herein in their entireties.

FIELD

The present application relates generally to methods and compositions for enhancing a fracturing operation.

BACKGROUND

Fracturing is a method to connect a wellbore with a rock formation for gas production. The process of fracturing is conducted by pumping fracking fluids at a flow rate exceeding the breaking pressure of the rock formation to create fractures. Traditionally, the fracking fluids carry solid materials known as proppants, which serve to keep the fractures open after fracturing the rock formation and to improve connectivity with the wellbore. If these proppants are not included, the fractures tend to close up, blocking the flow from the rock formation to the wellbore.

SUMMARY

The present application stems in part from the realization that current proppants do not always reach into all the fractures due to the geometry and size of the proppants as illustrated in FIG. 1. Because of these limitations, proppants can cluster and accumulate at certain locations within the fracture network, bridging and blocking other proppants from reaching into the deepest fractures as depicted in FIG. 1.

The present application provides strategies for enhancing fracturing operation. Embodiments of the present application include compositions and methods that can be used to minimize clustering of proppants or ensure that proppants reach into the deepest fractures and thereby enhance fracturing operation. In some embodiments, the methods and compositions involve magnetic proppants. In some embodiments, the methods and compositions utilize proppants with various sizes or densities, or both. Among other things, the present application encompasses the identification of the source of a problem when conventional proppants are used for the fracturing process.

In one aspect, the present application relates to methods for enhancing a fracturing operation in a rock formation. The methods include introducing a fracking fluid comprising magnetic proppants into a rock formation, wherein a median diameter of the magnetic proppants in the fracking fluid introduced into the rock formation increases over time.

In some embodiments, the method comprises introducing sequential batches of fracking fluid into the rock formation and the median diameter of the magnetic proppants in the fracking fluid increases in a step-wise fashion from batch-to-batch. In some embodiments, the method comprises adding sequential batches of magnetic proppants to a continuous stream of fracking fluid that is introduced into the rock formation, wherein the median diameter of the magnetic proppants that are added to the fracking fluid increases in a step-wise fashion from batch-to-batch.

In some embodiments, the method comprises adding magnetic proppants to a continuous stream of fracking fluid that is introduced into the rock formation, wherein the median diameter of the magnetic proppants that are added to the fracking fluid increases over time.

In some embodiments, the method comprises introducing a first composition comprising first magnetic proppants and a fracking fluid into the rock formation and then introducing a second composition comprising second magnetic proppants and a fracking fluid into the rock formation, wherein a median diameter of the first magnetic proppants is less than a median diameter of the second magnetic proppants. In some embodiments, the method further comprises introducing a third composition comprising third magnetic proppants and a fracking fluid to the rock formation, wherein the median diameter of the second magnetic proppants is less than a median diameter of the third magnetic proppants.

In some embodiments, the magnetic proppants comprise a magnetic core, an insulator coating layer, and an outer coating layer. In some embodiments, the magnetic core comprises a first magnetic pole and a second magnetic pole. In some embodiments, the magnetic core comprises a material selected from the group consisting of Co, Fe, $Fe_2O_3$, $FeOFe_2O_3$, $NiOFe_2O$, $CuOFe_2O_3$, $MgOFe_2O_3$, MnBi, Ni, MnSb, $MnOFe_2O_3$, $Y_3Fe_5O_{12}$, $CrO_2$, MnAs, Gd, Tb, Dy, EuO, and combinations thereof.

In some embodiments, the insulator coating layer is located on at least a portion of an external surface of the magnetic core, the insulator coating layer comprises a material with a high magnetic permeability, and the insulator coating layer shields at least a portion of a magnetic field generated by the first magnetic pole. In some embodiments, the insulator coating layer comprises a mu metal.

In some embodiments, the outer coating layer covers at least a portion of an external surface of the magnetic core. In some embodiments, the outer coating layer comprises a material with a high magnetic permeability embedded in a matrix material that is soluble at about 70 to 300 degree Fahrenheit in a fracking fluid having a pH in a range of about 6 to 8. In some embodiments, the outer coating layer shields at least a portion of a magnetic field generated by the second magnetic pole. In some embodiments, the outer coating layer comprises a mu metal. In some embodiments, the outer coating layer is located on both the insulator coating layer and the external surface of the magnetic core. In some embodiments, a diameter of the magnetic core is about 50 to 90% of a diameter of the magnetic proppant. In some embodiments, a thickness of the insulator coating layer is about 5 to 25% of the diameter of the magnetic proppant. In some embodiments, a thickness of the outer coating layer is about 5 to 25% of the diameter of the magnetic proppant.

In some embodiments, the magnetic proppant further comprises a radioactive tracer.

In some embodiments, the median diameter of the first magnetic proppants is within a range from 0.1 to 1 mm. In some embodiments, the median diameter of the second magnetic proppants is within a range from 0.5 to 1.5 mm. In some embodiments, the median diameter of the third magnetic proppants is within a range from 1 to 5 mm.

In some embodiments, the first composition has a concentration of the first magnetic proppants in a range of 0.1 to 20 pound per gallon. In some embodiments, second composition has a concentration of the second magnetic proppants in a range of 0.1 to 20 pound per gallon. In some embodiments, the third composition has a concentration of the third magnetic proppants in a range of 0.1 to 20 pound per gallon.

In another aspect, the present application relates to magnetic proppants. In some embodiments, the magnetic proppant comprises (a) a magnetic core comprising a first magnetic pole and a second magnetic pole, (b) an insulator coating layer located on at least a portion of an external surface of the magnetic core, wherein the insulator coating layer comprises a material with a high magnetic permeability, and the insulator coating layer shields at least a portion of a magnetic field generated by the first magnetic pole, and (c) an outer coating layer located on at least a portion of the external surface of the magnetic core, wherein the outer coating layer comprises a material with a high magnetic permeability embedded in a matrix material that is soluble at about 70 to 300 degree Fahrenheit in a fracking fluid having a pH in a range of about 6 to 8, and wherein the outer coating layer shields at least a portion of a magnetic field generated by the second magnetic pole. In some embodiments, the magnetic core comprises a material selected from the group consisting of Co, Fe, $Fe_2O_3$, $FeOFe_2O_3$, $NiOFe_2O$, $CuOFe_2O_3$, $MgOFe_2O_3$, MnBi, Ni, MnSb, $MnOFe_2O_3$, $Y_3Fe_5O_{12}$, $CrO_2$, MnAs, Gd, Tb, Dy, EuO, and combinations thereof. In some embodiments, the insulator coating layer comprises a mu metal. In some embodiments, the outer coating layer comprises a mu metal. In some embodiments, the outer coating layer is located on both the insulator coating layer and the external surface of the magnetic core. In some embodiments, a diameter of the magnetic core is about 50 to 90% of a diameter of the magnetic proppant. In some embodiments, a thickness of the insulator coating layer is about 5 to 25% of the diameter of the magnetic proppant. In some embodiments, a thickness of the outer coating layer is about 5 to 25% of the diameter of the magnetic proppant.

In some embodiments, the magnetic proppant further comprises a radioactive tracer.

In another aspect, the present application provides compositions comprising (i) a plurality of the magnetic proppants and (ii) a fracking fluid. In some embodiments, the plurality of the magnetic proppants is present in the fracking fluid in an amount that ranges from 0.1 to 20 pound per gallon. In some embodiments, the fracking fluid comprises water, polymers and additives.

BRIEF DESCRIPTION OF THE DRAWING

In the drawings, like reference characters generally refer to the same parts throughout the different views. Also, the drawings are not necessarily to scale, emphasis instead generally being placed upon illustrating the principles of the invention and are not intended as a definition of the limits of the invention. For purposes of clarity, not every component may be labeled in every drawing. In the following description, various embodiments of the present invention are described with reference to the following drawings, in which:

FIG. 6A depicts the fracture where the magnetic proppants still comprise the outer coating layer shielding both of the magnetic poles. FIG. 6B depicts the same fracture after the outer coating layer has dissolved, and one of the magnetic poles is revealed causing the proppants to repel each other. FIG. 6C shows how the magnetic proppants keep the fracture open when external forces would otherwise cause the fracture to collapse.

DETAILED DESCRIPTION

Throughout the description, where methods are described as having, including, or comprising specific steps, or where compositions are described as having, including, or comprising specific components, it is contemplated that, additionally, there are methods according to the present application that consist essentially of, or consist of, the recited processing steps, and that there are compositions of the present application that consist essentially of, or consist of, the recited components.

It should be understood that the order of steps or order for performing certain actions is immaterial so long as the method remains operable. Moreover, two or more steps or actions may be conducted simultaneously.

The present application encompasses the insight that fracturing operation may be enhanced by using magnetic proppants of particular sizes or densities, or both that decrease clustering, or can be delivered into deeper and narrower fractures. Furthermore, in some embodiments, the magnetic proppants may be designed so that they repel each other within the fractures.

Magnetic Proppants

Figure 4:
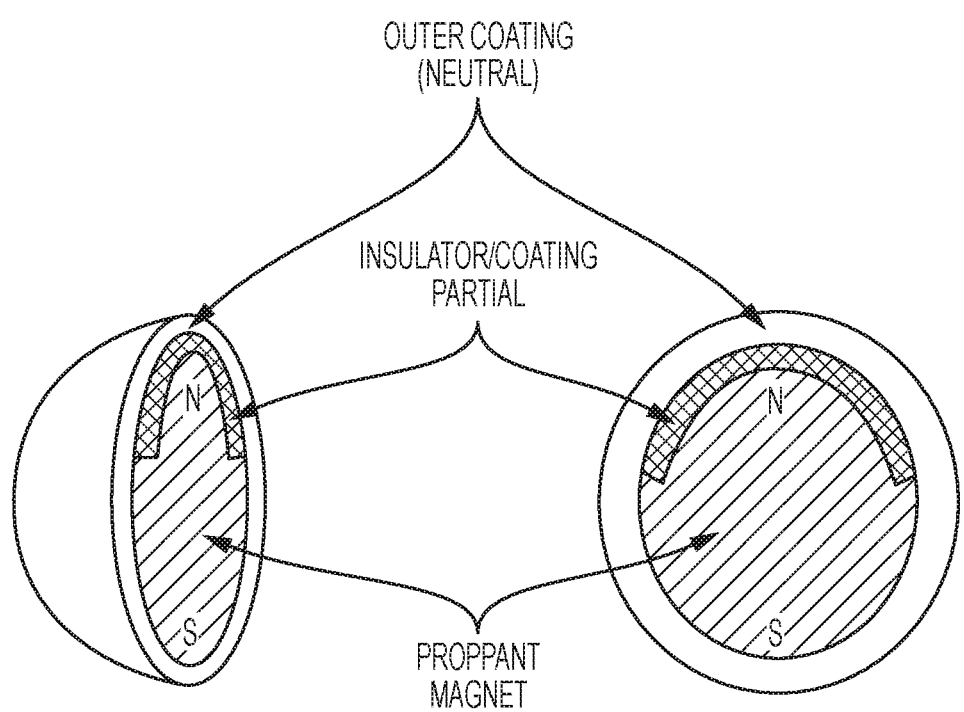
FIG. 4 shows an inner structure of a magnetic proppant according to an illustrative embodiment of the present application.

In some embodiments, magnetic proppants provided by the present application comprise a magnetic core, an insulator coating layer, and an outer coating layer. An exemplary embodiment of a magnetic proppant is illustrated in FIG. 4.

Magnetic Core

In some embodiments, the magnetic core is magnetized and creates a persistent magnetic field, having a first magnetic pole and a second magnetic pole. In some embodiments, the magnetic core comprises one or more ferromagnetic materials. In some embodiments, the ferromagnetic material is selected from the group consisting of Co, Fe, $Fe_2O_3$, $FeOFe_2O_3$, $NiOFe_2O$, $CuOFe_2O_3$, $MgOFe_2O_3$, MnBi, Ni, MnSb, $MnOFe_2O_3$, $Y_3Fe_5O_{12}$, $CrO_2$, MnAs, Gd, Tb, Dy, EuO, and combinations thereof. In some embodiments, a diameter of the magnetic core is about 0.1 to 1 millimeter (mm), 0.1 to 0.5, or 0.15 to 0.4 mm. In some embodiments, a diameter of the magnetic core is about 0.1 to 3 mm, 0.1 to 1 mm, or 0.5 to 1 mm. In some embodiments, a diameter of the magnetic core is about 1 to 5 mm, 1 to 3.5 mm, or 1.5 to 3.5 mm.

In some embodiments, a diameter of the magnetic core is about 50 to 90%, 55 to 90%, 60 to 90%, 65 to 90%, 70 to 90%, 50 to 85%, 50 to 80%, 55 to 80%, 60 to 80%, or 70 to 80% of a diameter of the magnetic proppant.

Insulator Coating Layer

Figure 5:
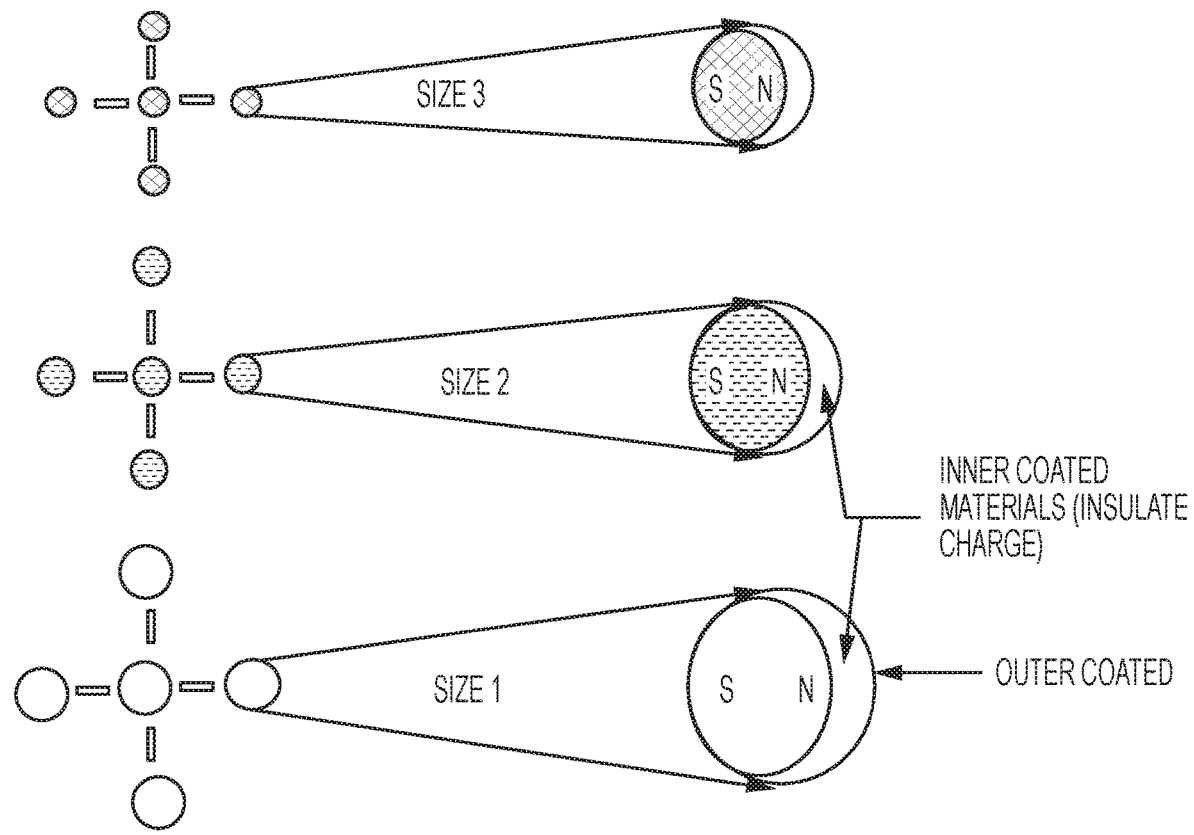
FIG. 5 depicts three different sizes of magnetic proppants, each of which comprises an insulator coating layer and an outer coating layer.

In some embodiments, the insulator coating layer is located on an external surface of the magnetic core. In some embodiments, the insulator coating layer may not cover the entire external surface of the magnetic core. For example, the insulator coating layer covers a portion of the external surface of the magnetic core. In some embodiments, the insulator coating layer shields a portion of the magnetic field generated by the magnetic core, so that if each of the magnetic proppants comprises the magnetic core and the insulator coating layer (without the outer coating layer), the magnetic proppants repel each other. For example, the insulator coating layer may shield the magnetic field generated by the first magnetic pole as shown in FIG. 5.

In some embodiments, the insulator coating layer comprises a material with a high magnetic permeability which provides a low reluctance path for magnetic flux. For example, the insulator coating layer may comprise a material having a magnetic relative permeability range of 10,000 to 1,000,000, 50,000 to 500,000, or 50,000 to 200,000. In some embodiments, the insulator coating layer comprises a mu metal. For example, a mu metal is a nickel-iron soft magnetic alloy with very high permeability, which is used for shielding sensitive electronic equipment against static or low-frequency magnetic fields. In some embodiments, the mu metal is selected from the group consisting of nickel, iron, copper, chromium, molybdenum, Co-Netic, supermalloy, supermumetal, nilomag, sanbold, molybdenum permalloy, Sendust, M-1040, Hipernom, HyMu-80, Amumetal, pyrolytic graphite and combinations thereof.

In some embodiments, the insulator coating layer consists of a material with a high magnetic permeability (for example, a mu metal) which has been deposited on a portion of the external surface of the magnetic core.

In some embodiments, the average thickness of the insulator coating layer is within a range of about 5 to 25%, 5 to 20%, 5 to 15%, 10 to 25%, 10 to 20%, or 10 to 15% of a diameter of the magnetic proppant. In some embodiments, the thickness may be measured from cross-sectional images of the magnetic proppants.

In some embodiments, the insulator coating layer covers about 15 to 85%, 25 to 75%, 35 to 65%, or 45 to 55% of the external surface of the magnetic core. In some embodiments, the coverage of the insulator coating layer may be calculated by comparing the strength of magnetic field before and after the deposition of the insulator coating layer.

In some embodiments, the insulator coating layer may comprise an adhesive material to assist adhesion of the insulator coating layer on the magnetic core.

Outer Coating Layer

In some embodiments, the outer coating layer covers at least a portion of the external surface of the magnetic core. In some embodiments, the outer coating layer may cover at least the external surface of the magnetic core that is not covered by the insulator coating layer. In some embodiments, the outer coating layer may also cover at least a portion of the insulator coating layer. For example, in some embodiments, the outer coating layer may cover both the insulator coating layer and the external surface of the magnetic core that is not covered by the insulator coating layer as shown in FIG. 4.

In some embodiments, the outer coating layer shields the magnetic field generated by the magnetic core that is not already shielded by the insulator coating layer, so that magnetic proppants comprising the magnetic core, the insulator coating layer and the outer coating layer do not repel each other. For example, the outer coating layer shields the magnetic field generated by the second magnetic pole as illustrated in FIG. 4. In some embodiments, the outer coating layer facilitates pumping operations by reducing the degree of interaction (repulsion or attraction) between the magnetic proppants when they are stored and initially added to the fracking fluid.

In some embodiments, the outer coating layer comprises a material with a high magnetic permeability. For example, the insulator coating layer may comprise a material having a magnetic relative permeability range of 10,000 to 1,000,000, 50,000 to 500,000, or 50,000 to 200,000. In some embodiments, the outer coating layer comprises a mu metal. In some embodiments, the mu metal is selected from the group consisting of nickel, iron, copper, chromium, molybdenum, Co-Netic, supermalloy, supermumetal, nilomag, sanbold, molybdenum permalloy, Sendust, M-1040, Hipernom, HyMu-80, Amumetal, pyrolytic graphite and combinations thereof. In some embodiments, the material with a high magnetic permeability (for example, a mu metal) is embedded within a matrix material that is soluble at 70 to 300 degrees Fahrenheit in a fracking fluid which comprises water, polymers and additives and has a pH in the range of 6 to 8. In some embodiments, the matrix material is selected from the group consisting of TervAlloy™, Elementum™, TervAlloy MMC™, Elementum™, Response™ Coatings, DissolvAssure™, SmartCORE™, and combinations thereof.

In some embodiments, the matrix material dissolves completely within 3 to 24 hours (for example, within 6 to 15 hours) after the magnetic proppant is contacted with the fracking fluid at about 70 to 300 degrees Fahrenheit, without stirring.

In some embodiments, the average thickness of the outer coating layer is about 5 to 25%, 5 to 20%, 5 to 15%, 10 to 25%, 10 to 20%, or 10 to 15% of the average diameter of the magnetic proppant.

In some embodiments, the outer coating layer covers about 50 to 100%, 75 to 100%, 90 to 100% or 100% of the external surface of the magnetic core.

Method of Making Magnetic Proppants

In some embodiments, a method of making a magnetic proppant comprising a magnetic core, an insulator coating layer, and an outer coating layer comprises depositing the insulator coating layer on a surface of the magnetic core. In some embodiments, the method further comprises depositing the outer coating layer on the surface of the magnetic core or a surface of the insulator coating layer, or both.

In some embodiments, the method further comprises aligning the magnetic core by applying an external magnetic field, so that the insulator coating layer is deposited on a desired portion of the magnetic core only.

In some embodiments, the insulator coating layer may be chemically deposited on the surface of the magnetic core. In some embodiments, the insulator coating layer may be physically deposited (for example, utilizing physical vapor) on the surface of the magnetic core.

In some embodiments, the outer coating layer may be chemically deposited on the surface of the magnetic core or the surface of the insulator coating layer, or both. In some embodiments, the outer coating layer may be physically deposited (for example, utilizing physical vapor) on the surface of the magnetic core or the surface of the insulator coating layer, or both.

In some embodiments, the chemical deposition method is selected from the group consisting of plating, chemical solution deposition, Langmuir-Blodgett method, spinning coating, dip coating, chemical vapor deposition, plasma enhanced chemical vapor deposition, atomic layer deposition, and combinations thereof.

In some embodiments, the physical vapor may be created by thermal evaporator, electron beam evaporator, molecular beam epitaxy, sputtering, pulsed laser deposition system, cathodic arc deposition, or electrohydrodynamic deposition.

Figure 7:
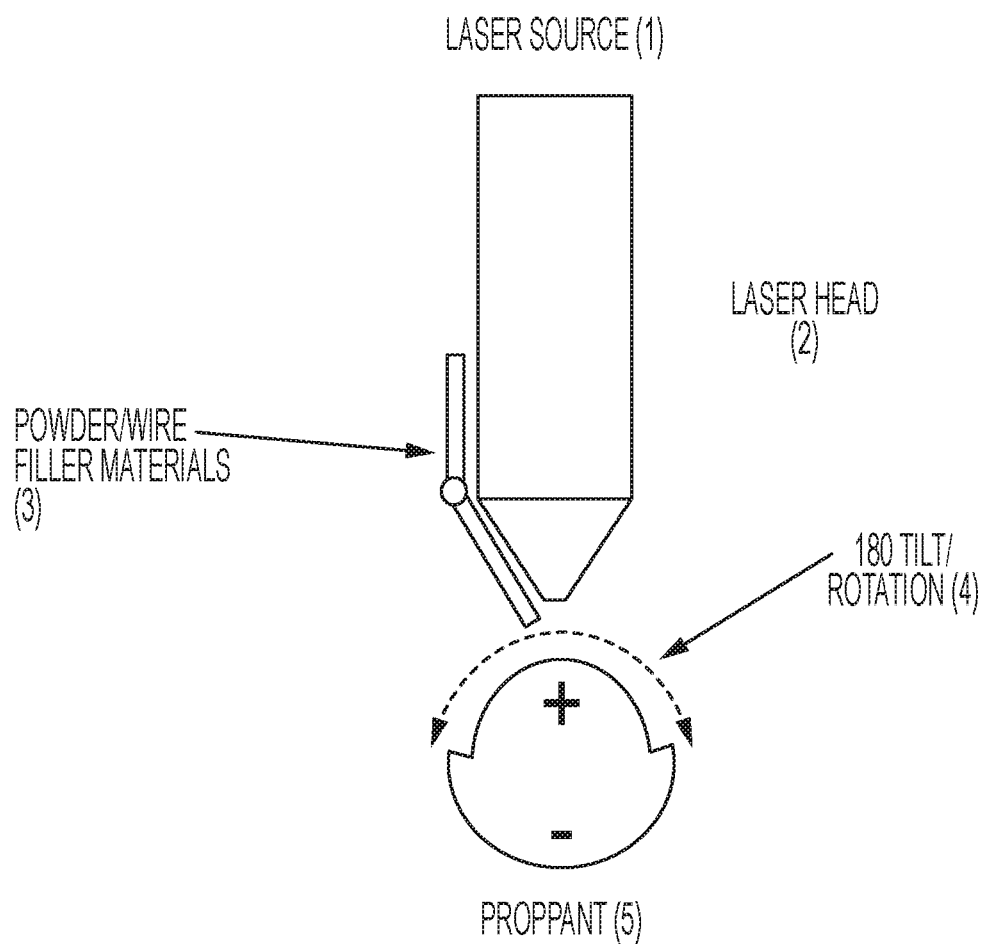
FIG. 7 illustrates an exemplary set-up of laser cladding for deposition of the insulator coating layer, the outer coating layer, or both.

In some embodiments, the insulator coating layer may be deposited on the surface of the magnetic core by using laser cladding. Similarly, in some embodiments, the outer coating layer may be deposited on the surface of the insulator coating layer or the magnetic core by using laser cladding. For example, a material for the insulator coating layer or the outer coating layer (for example, a mu metal) can be melted and consolidated by use of a laser in order to coat the magnetic core (or the insulator coating layer) as illustrated in FIG. 7. The laser source (1) may provide the laser energy through the laser cutting head (2). The laser head may be at a short distance (for example, about 10 to 100 millimeter) to the target. The deposit material (for example, the insulator coating layer material, the outer coating layer material, the mu metal) may be supplied by the powder nozzle or it can be hotwire (3). The laser head may be tilted (4) to fallow the curvature of the magnetic core (5). Without wishing to be bound by any particular theory, laser cladding may provide a permanent, strong bond. In some embodiments, the magnetic core is a commercially available permanent magnet.

Composition Comprising Magnetic Proppants

In some embodiments, compositions provided by the present application comprise a fracking fluid and one or more magnetic proppants.

In some embodiments, the composition has a concentration of the magnetic proppants in a range of 0.1 to 20, 0.1 to 18, 0.1 to 16, 0.1 to 14, or 0.1 to 12 pound per gallon.

In some embodiments, the fracking fluid is gel, foam or liquid. In some embodiments, the fracking fluid has a pH range of 6 to 8. In some embodiments, the fracking fluid has a viscosity range of 10 to 10,000 cp at a shear rate of 10-1000 $\sec^{-1}$.

In some embodiments, the fracking fluid comprises a solvent. For example, the fracking fluid comprises slick water. In some embodiments, the fracking fluid comprises one or more additives selected from the group consisting of a biocide, a breaker, a buffer, a clay stabilizer, a diverting agent, a fluid loss additive, a friction reducer, an iron controller, surfactant, a gel stabilizer, and combinations thereof. In some embodiments, the biocide may comprise glutaraldehyde carbonate. In some embodiments, the breaker (for example, the breaker reduces fluid viscosity) may comprise an acid, an oxidizer, or an enzyme breaker. In some embodiments, the buffer may comprise sodium bicarbonate, or fumaric acid. In some embodiments, the clay stabilizer (for example, the clay stabilizer reduces clay swelling) may comprise KCl, NHCl, or KCl substitute. In some embodiments, the diverting agent (for example, the diverting agent diverts flow of fluid) may comprise ball sealers, rock salt, or flake boric acid. In some embodiments, the friction reducer may comprise an anionic copolymer. In some embodiments, the iron controller (for example, the iron controller keeps iron in solution) may comprise acetic acid or citric acid. In some embodiments, the surfactant may comprise fluorocarbon or other non-ionic surfactant. In some embodiments, the gel stabilizer (for example, the gel stabilizer reduces thermal degradation) may comprise methanol, or sodium thiosulphate. In some embodiments, the fracking fluid comprises carbon nanotubes.

In some embodiments, the magnetic proppants are permeable or permittive to gas under high pressures (for example, a pressure within a range of 500 to 12,000 psi). For example, in some embodiments, the magnetic proppants have a gas permeability range of no less than about 1 millidarcy, 0.9 millidarcy, 0.8 millidarcy, 0.7 millidarcy, 0.6 millidarcy, 0.5 millidarcy, 0.4 millidarcy, 0.3 millidarcy, 0.2 millidarcy, 0.1 millidarcy, 0.05 millidarcy or 0.01 millidarcy.

Magnetic Proppant Shielding Both Magnetic Poles of Magnetic Core

In some embodiments, magnetic proppants in the composition may not repel or attract each other. For example, the magnetic fields generated by the magnetic cores are shielded (for example, magnetic fields from both the first and second magnetic poles of the magnetic cores are shielded). In some embodiments, the composition comprises magnetic proppants that comprise a magnetic core, an insulator coating layer, and an outer coating layer, as discussed above.

Magnetic Proppant Shielding One Magnetic Pole of Magnetic Core

In some embodiments, magnetic proppants in the composition may repel each other. In some embodiments, at least a portion of the magnetic field generated by the first magnetic pole of the magnetic core, is shielded by the insulator coating layer. In some embodiments, at least a portion of the second magnetic pole of the magnetic core is exposed.

In some embodiments, the composition comprises magnetic proppants that comprise a magnetic core and an insulator coating layer but lack an outer coating layer, as discussed above.

In some embodiments, the composition comprises magnetic proppants that comprise a magnetic core, an insulator coating layer, and an outer coating layer. In some embodiments, the outer coating layer is partially dissolved and shields only a portion of the magnetic field generated by the second magnetic pole (for example, at least a portion of the second magnetic pole of the magnetic core is revealed). In some embodiments, the composition may comprise fragments of the outer coating layer that have dissolved in the fracking fluid.

Use of Magnetic Proppants for Enhancing Fracturing Operation

In some embodiments, methods provided by the present application use magnetic proppants to enhance fracturing operation.

In some embodiments, different sizes or weights, or both of magnetic proppants are used. In some embodiments, the methods comprise introducing a composition comprising magnetic proppants and a fracking fluid into a rock formation. In some embodiments, at least for a time period, a median diameter or weight of the magnetic proppants applied to the rock formation increases (for example, continuously or discretely, or both), as the fracking operation progresses.

In some embodiments, the methods may involve the sequential introduction of batches of fracking fluid with different magnetic proppants. (for example a batch that includes small or light, or both magnetic proppants, followed by a batch that includes medium magnetic proppants, followed by a batch that includes large or heavy, or both magnetic proppants).

Figure 1:
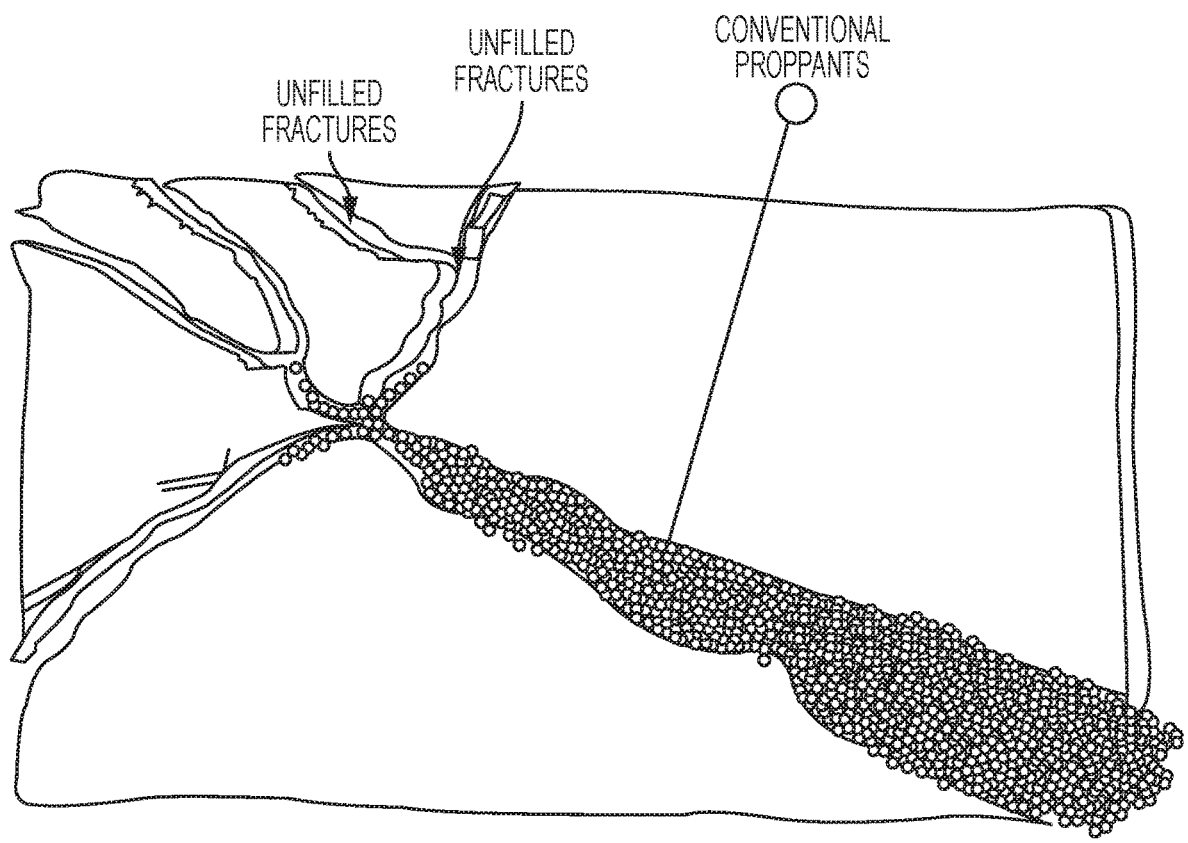
FIG. 1 depicts fractures not fully filled with conventional proppants because of proppant accumulation.
Figure 2:
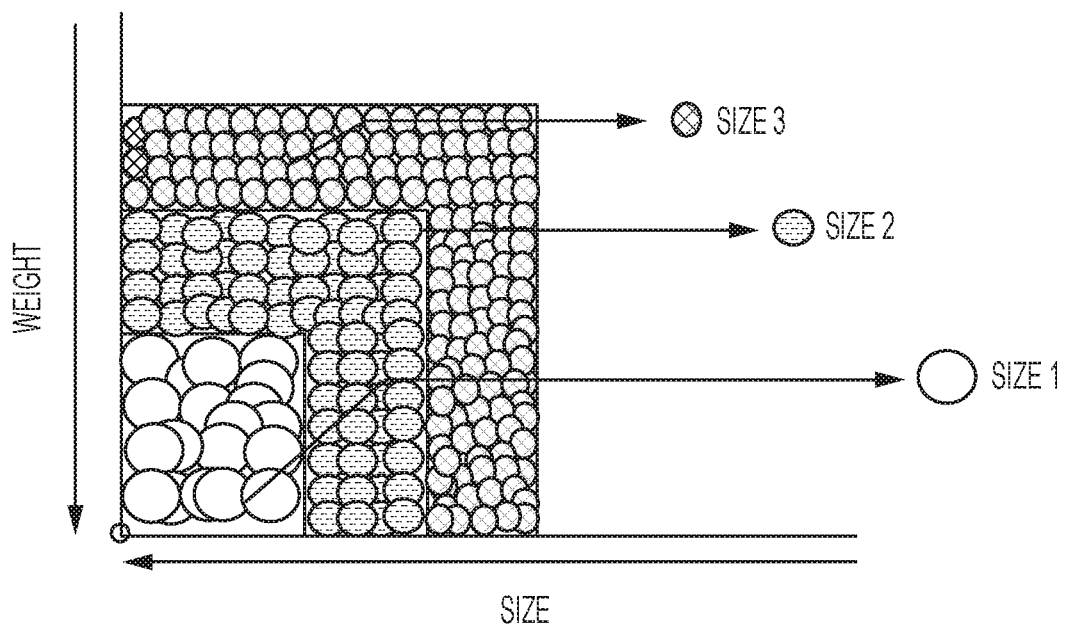
FIG. 2 shows proppants with different sizes and weights. Size 1 proppants are the biggest and heaviest and Size 3 proppants are the smallest and lightest.
Figure 3:
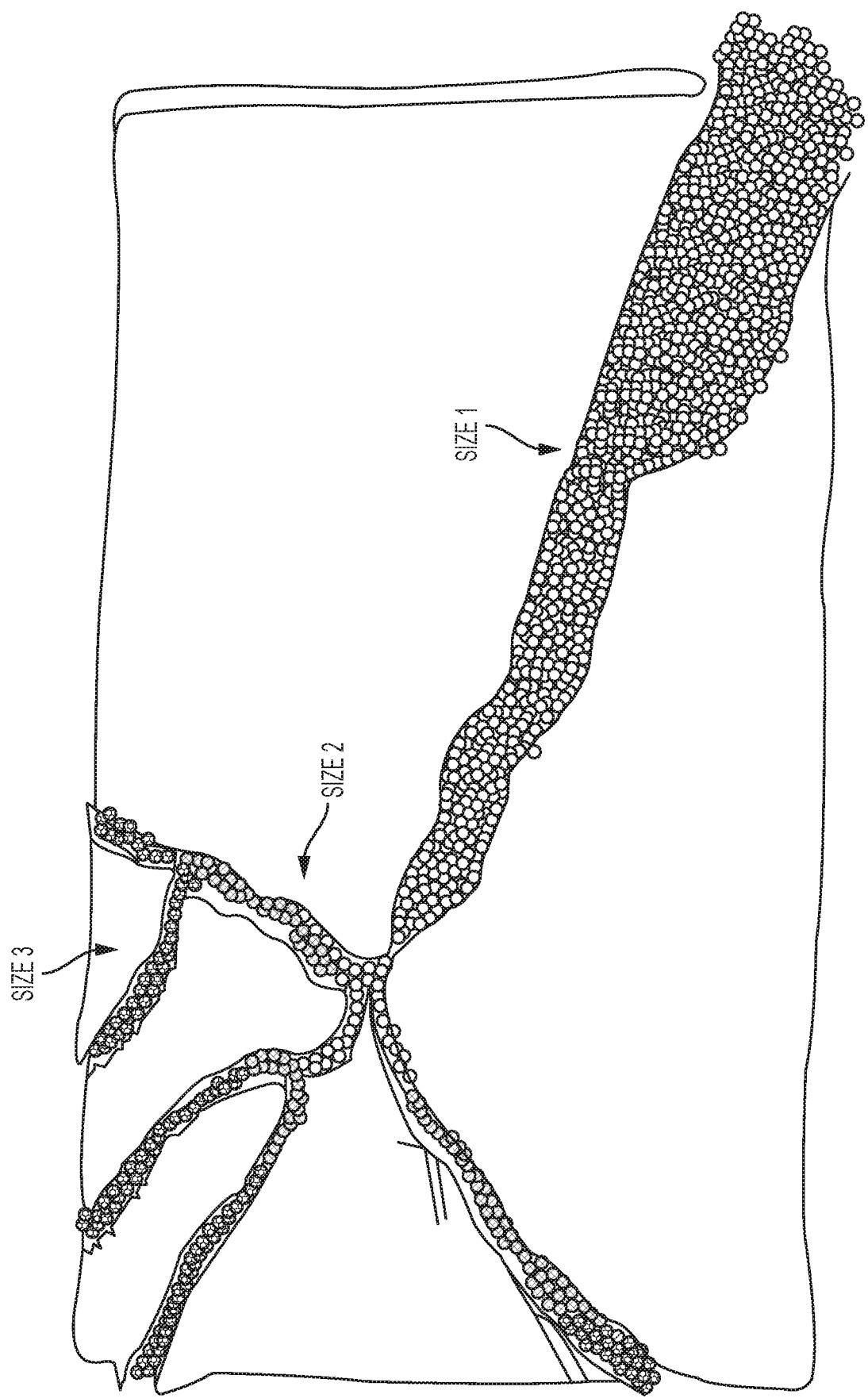
FIG. 3 depicts proppants with different sizes and weights distributed in fractures. The smallest (Size 1) proppants reach the narrowest and deepest fractures, the medium proppants (Size 2) fill up the intermediate sections of the fractures, and the largest and heaviest proppants (Size 3) fill up the widest sections of the fractures.

In some embodiments, the methods involve introducing a first composition comprising first magnetic proppants (for example, small or light, or both magnetic proppants, Size 3 in FIG. 2,) followed by a second composition comprising second magnetic proppants (for example, medium magnetic proppants, Size 2 in FIG. 2). In some embodiments, a median diameter of the first magnetic proppants is smaller than a median diameter of the second magnetic proppants. In some embodiments, a median weight of the first magnetic proppants is smaller than a median weight of the second magnetic proppants. For example, the first magnetic proppants may be applied first, and then the second magnetic proppants may be applied second, as shown in FIG. 3. The first magnetic proppants may be delivered to narrower or deeper, or both fractures relative to the second magnetic proppants. This approach may improve proppant distribution in the fractures, and may prevent the clustering and accumulation of proppants.

In some embodiments, the methods may involve a third composition comprising third magnetic proppants (for example, large or heavy, or both magnetic proppants, Size 1 in FIG. 2). In some embodiments, a median diameter of the second magnetic proppants is smaller than a median diameter of the third magnetic proppants. In some embodiments, a median weight of the second magnetic proppants is smaller than a median weight of the third magnetic proppants. For example, the third magnetic proppants may be applied after application of the first and second magnetic proppants, as shown in FIG. 3. The second magnetic proppants may be delivered to narrower or deeper, or both fractures relative to the third magnetic proppants.

Similarly, in some embodiments, the methods may involve the application of fourth, fifth, sixth, seventh, eighth, ninth or tenth magnetic proppants. Each application may introduce larger or heavier, or both magnetic proppants (for example, the median diameter or median weight may increase as the number of the applications increases). In general, the number and characteristics of the magnetic proppants that are used in a method of the present application will depend on the type of rock formation and the predicted fracture network. In some embodiments, the number and characteristics of the magnetic proppants may be selected based on prior data regarding the dimensions of fractures typically observed or measured in the rock formation of interest (for example, based on data collected from parallel or historical fracturing operations in the same or similar rock formations).

In some embodiments, the methods may involve the continuous introduction of a fracking fluid to which different magnetic proppants are added at different time points (for example starting with the addition of small magnetic proppants to the fracking fluid, then adding medium magnetic proppants and then adding large magnetic proppants, optionally with some period where both small and medium (or medium and large) proppants are being added to the fracking fluid to create a gradual change in the median diameter or median weight of the magnetic proppants). It will be appreciated that the median diameter and median weight of the proppants being introduced into the rock formation may change in a step wise fashion over time or may change more gradually over time (for example in a linear fashion or in accordance with a curve that can be fitted with a polynomial function).

Figure 6C:
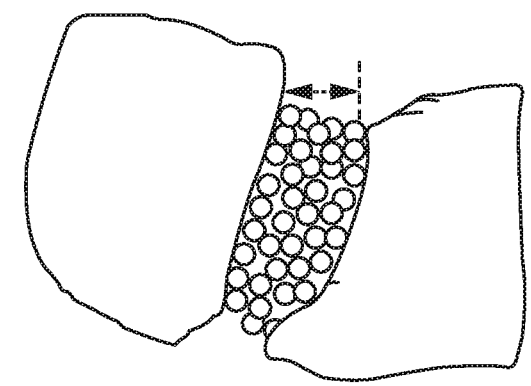
FIGS. 6A-6C illustrate a fracture in the presence of exemplary magnetic proppants according to the present application.
Figure 6B:
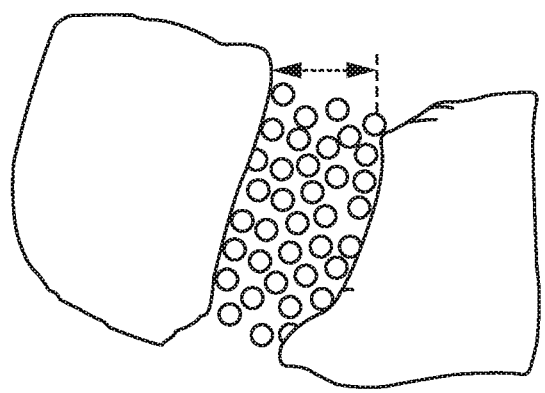
Figure 6A:
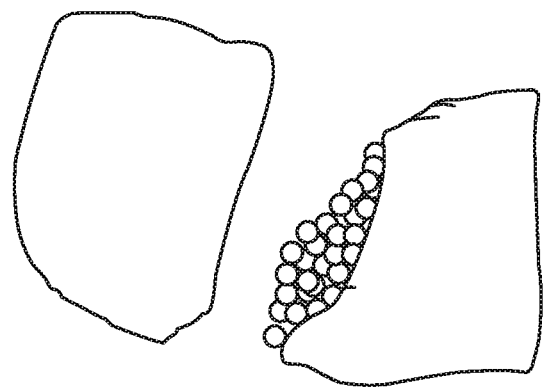

In some embodiments, the methods may involve using magnetic proppants that comprise a magnetic core, an insulator coating layer, and an outer coating layer as described above. In some embodiments, during the application process, both magnetic poles of the magnetic cores are shielded by the insulator coating layer and the outer coating layer, so that the magnetic proppants do not repel or attract each other. After a period of time, the outer coating layer dissolves in the fracking fluid, so that the magnetic proppants repel each other resulting in more stable fractures within the rock formation as illustrated in FIGS. 6A-6B.

In some embodiments, the median diameter of the first magnetic proppants is within a range from 0.01 to 1 mm, 0.05 to 1 mm, 0.1 to 1 mm, 0.01 to 1.5 mm, 0.05 to 1.5 mm, or 0.1 to 1.5 mm. In some embodiments, the median diameter of the second magnetic proppants is within a range from 0.3 to 1.5 mm, 0.3 to 2.0 mm, 0.3 to 2.5 mm, 0.3 to 3 mm, 0.5 to 1.5 mm, 0.5 to 2.0 mm, 0.5 to 2.5 mm, or 0.5 to 3 mm. In some embodiments, the median diameter of the third magnetic proppants is within a range from 0.5 to 7 mm, 1 to 7 mm, 0.5 to 5 mm, or 1 to 5 mm.

Other Embodiments

Certain embodiments of the present application were described above. It is, however, expressly noted that the present application is not limited to those embodiments, but rather the intention is that additions and modifications to what was expressly described in the present application are also included within the scope of the application. Moreover, it is to be understood that the features of the various embodiments described in the present application were not mutually exclusive and can exist in various combinations and permutations, even if such combinations or permutations were not made expressly, without departing from the spirit and scope of the application. Having described certain implementations of the methods of the present application, it will now become apparent to one of skill in the art that other implementations incorporating the concepts of the application may be used. Therefore, the application should not be limited to certain implementations, but rather should be limited only by the spirit and scope of the following claims.

I claim:

1. A method for enhancing a fracturing operation in a rock formation, the method comprising introducing a fracking fluid comprising magnetic proppants into a rock formation, wherein a median diameter of the magnetic proppants in the fracking fluid introduced into the rock formation increases over time, wherein:
    each of the magnetic proppants comprises a magnetic core, an insulator coating layer, and an outer coating layer;
    the magnetic core comprises a first magnetic pole and a second magnetic pole; and
    the outer coating layer covers at least a portion of an external surface of the magnetic core, the outer coating layer comprises a material with a high magnetic permeability embedded in a matrix material that is soluble at about 70 to 300 degree Fahrenheit in a fracking fluid having a pH in a range of about 6 to 8, and the outer coating layer shields at least a portion of a magnetic field generated by the second magnetic pole.

2. The method of claim 1, wherein the method comprises introducing sequential batches of the fracking fluid into the rock formation and the median diameter of the magnetic proppants in the fracking fluid increases in a step-wise fashion from batch-to-batch.

3. The method of claim 1, wherein the method comprises adding sequential batches of magnetic proppants to a continuous stream of the fracking fluid that is introduced into the rock formation, wherein the median diameter of the magnetic proppants that are added to the fracking fluid increases in a step-wise fashion from batch-to-batch.

4. The method of claim 1, wherein the method comprises adding magnetic proppants to a continuous stream of the fracking fluid that is introduced into the rock formation, wherein the median diameter of the magnetic proppants that are added to the fracking fluid increases over time.

5. The method of claim 1, wherein the method comprises introducing first magnetic proppants into the rock formation and then introducing second magnetic proppants into the rock formation, wherein a median diameter of the first magnetic proppants is less than a median diameter of the second magnetic proppants.

6. The method of claim 5, further comprising introducing third magnetic proppants to the rock formation, wherein the median diameter of the second magnetic proppants is less than a median diameter of the third magnetic proppants.

7. The method of claim 1, wherein the magnetic core comprises a material selected from the group consisting of Co, Fe, $Fe_2O_3$, $FeOFe_2O_3$, $NiOFe_2O$, $CuOFe_2O_3$, $MgOFe_2O_3$, MnBi, Ni, MnSb, $MnOFe_2O_3$, $Y_3Fe_5O_{12}$, $CrO_2$, MnAs, Gd, Tb, Dy, EuO, and combinations thereof.

8. The method of claim 1, wherein the insulator coating layer is located on at least a portion of an external surface of the magnetic core, the insulator coating layer comprises a material with a high magnetic permeability, and the insulator coating layer shields at least a portion of a magnetic field generated by the first magnetic pole.

9. The method of claim 1, wherein the insulator coating layer comprises a mu metal.

10. The method of claim 1, wherein the outer coating layer comprises a mu metal.

11. The method of claim 1, wherein the outer coating layer is located on both the insulator coating layer and the external surface of the magnetic core.

12. The method of claim 1, wherein a diameter of the magnetic core is about 50 to 90% of a diameter of the magnetic proppant.

13. The method of claim 1, wherein a thickness of the insulator coating layer is about 5 to 25% of the diameter of the magnetic proppant.

14. The method of claim 1, wherein a thickness of the outer coating layer is about 5 to 25% of the diameter of the magnetic proppant.

15. The method of claim 1, wherein the magnetic proppant further comprises a radioactive tracer.

16. The method of claim 5, wherein the median diameter of the first magnetic proppants is within a range from 0.1 to 1 mm.

17. The method of claim 5, wherein the median diameter of the second magnetic proppants is within a range from 0.5 to 1.5 mm.

18. The method of claim 6, wherein the median diameter of the third magnetic proppants is within a range from 1 to 5 mm.

19. The method of claim 6, wherein a concentration of the first magnetic proppants in the fracking fluid is in a range of 0.1 to 20 pound per gallon, a concentration of the second magnetic proppants in the fracking fluid is in a range of 0.1 to 20 pound per gallon, or a concentration of the third magnetic proppants in the fracking fluid is in a range of 0.1 to 20 pound per gallon.

* * * * *